United States Patent [19]

Davis et al.

[11] 3,917,830
[45] Nov. 4, 1975

[54] STEROIDAL ANAESTHETIC COMPOSITION FOR INTRAVENEOUS INJECTION

[75] Inventors: Benjamin Davis, Chalfont St. Peter; Derek Roger Pearce, Bracknell; Paul Connor, Chalfont St. Giles, all of England

[73] Assignee: Glaxo Laboratories Limited, Greenford, England

[22] Filed: June 15, 1972

[21] Appl. No.: 263,133

Related U.S. Application Data

[63] Continuation-in-part of Ser. No. 208,924, Dec. 16, 1971, abandoned.

[30] Foreign Application Priority Data

Dec. 17, 1970 United Kingdom............... 60067/70

[52] U.S. Cl................................. 424/243; 424/231
[51] Int. Cl.$^2$......................................... A61K 17/00
[58] Field of Search ........................... 424/238–243

[56] References Cited

UNITED STATES PATENTS

| | | | |
|---|---|---|---|
| 3,714,352 | 1/1973 | Davis et al. | 424/243 |
| 3,763,195 | 10/1973 | Davis et al. | 260/397.45 |
| 3,781,435 | 12/1973 | Davis et al. | 424/239 |
| 3,816,624 | 6/1974 | Davis et al. | 424/243 |

FOREIGN PATENTS OR APPLICATIONS

| | | |
|---|---|---|
| 982,113 | 2/1965 | United Kingdom |
| 6,555M | 12/1968 | France |
| 834,913 | 5/1960 | United Kingdom |
| 941,694 | 11/1963 | United Kingdom |

OTHER PUBLICATIONS

Swerdlow et al. Brit. J. Anaesth. 43:1075–1080 "A Trial of CT1341" (1971).

Child et al. Brit. J. Anaesth. 43:2–13 "The Pharmacological Properties in Animals of CT 1341–A New Steroid Anaesthetic Agent" (1971).

Atkinson et al. J. Med. Chem. 8:426–432 (1965) "Action of Some Steroids on the Central Nervous System of the Mouse II Pharmacology".

*Primary Examiner*—Shep K. Rose
*Attorney, Agent, or Firm*—Bacon & Thomas

[57] ABSTRACT

A composition for use by injection as an anaesthetic comprising 3α-hydroxy 5α- pregnane - 11,20 dione in solution in an inert organic liquid medium. The composition may be in the form of a solution which also contains water, a non-aqueous solution or an emulsion or microemulsion. The emulsions and microemulsions are preferably of the oil-in-water type.

Water-miscible substances which may be used as or in the liquid medium include polyhydroxy alcohols and water-soluble esters and amides. Other substances which may be used as the liquid medium include oils, long chain alcohols and esters, and fatty acid esters.

4 Claims, No Drawings

STEROIDAL ANAESTHETIC COMPOSITION FOR INTRAVENEOUS INJECTION

This Application is a continuation-in-part of our application Ser. No. 208,924 filed Dec. 16, 1971 and now abandoned.

This invention is concerned with improvements in or relating to pharmaceutical preparations having anaesthetic activity.

It has long been known that a number of steroids give rise to profound depression of the central nervous system and act pharmacodynamically as anaesthetics or hypnotics. Such compounds have been the subject of considerable study in an attempt to find anaesthetics to replace such substances as thiopentone sodium normally used but well known to be accompanied by some degree of hazard or disadvantage. The literature shows that very many steroid compounds have been studied in this regard. Reviews and discussions of some of the work carried out are to be found, for example, in "Methods in Hormone Research" (Edited by Ralph I. Dorfman, Vol. III, Part A, Academic Press, London and New York 1964, pages 415–475); H. Witzel, Z. Vitamin Hormon-Fermentforsch 1959, 10, 46–74; H. Selye, Endocrinology, 1942, 30, 437–453; S. K. Figdor et al., J. Pharmacol. Exptl. Therap., 1957, 119, 299–309 and Atkinson et al., J. Med. Chem. 1965, 8, 426–432.

A thorough review of the literature indicates that anaesthetic steroids generally possess poor activity and/or long induction periods. With such compounds a variety of undesired side effects such as paraesthesia and vein damage have been noted. Many steroid compounds having anaesthetic action are also of poor solubility and thus much research has hitherto been directed to the introduction of solubilising groups into such steroids, e.g. by the formation of partial esters with di- or polybasic acids; such work has hitherto not resulted in the discovery of a satisfactory anaesthetic steroid compound. Anaesthetic steroids are generally relatively simple pregnane derivatives often hydroxylated in the 3-position, the general trend having been in the latter case to study 3β-hydroxy compounds rather than 3α-hydroxy compounds.

In application Ser. No. 47,163 of Davis et al now Pat. No. 3,714,352, are described anaesthetic compositions containing as principal anaesthetic component 3α-hydroxy-5α-pregnane-11, 20-dione. As stated in the Application of Davis et al this substance has quite remarkable properties as an anaesthetic in human and veterinary medicine and the compositions of our said Application thus induce anaesthesia and possess short induction periods, the anaesthetic action at suitable doses being indeed instantaneous; the solutions are thus excellent anaesthetics for inducing anaesthesia which is to be maintained e.g. by an inhalation anaesthetic such as ether, halothane, nitrous oxide, and trichloroethylene. The solutions are however capable of maintaining anaesthesia and analgesia to a sufficient degree to enable various surgical operations to be conducted without the aid of an inhalation anaesthetic, the required degree of anaesthesia being maintained if necessary by repeated administration (or even continuous administration). Recovery from anaesthesia (where this is induced only by the solutions of said prior Application) is excellent, the patient exhibiting a feeling of well-being in distinction to the unpleasant after effects generally associated with conventional anaesthetics. Moreover, the aforesaid anaesthetic solutions in general give rise to none of the undesired side-effects previously associated with steroidal anaesthetics.

The compositions of the Davis et al prior Application are aqueous solutions containing 3α-hydroxy-5α-pregnane-11,20-dione.

In accordance with this invention we have found that 3α-hydroxy-5α-pregnane-11,20-dione has good solubility in a number of organic liquids; this discovery has enabled us to formulate compositions based on, or derived from, solutions of the said steroid in organic liquids. We have further found that the solubility of the said steroid )3α-hydroxy-5α(11,20-dione, hereinafter referred to as steroid I) in organic liquids and especially in oils and liquids of an oily nature, is very substantially enhanced by the presence of steroids of the general formula

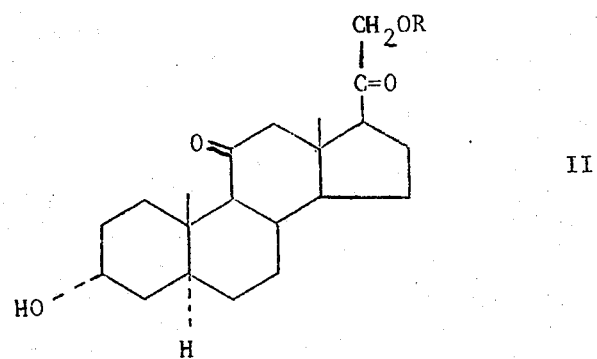

[wherein R is an alkanoyl group having a straight or branched chain (containing for example 2–4 carbon atoms which may, if desired be substituted, for example by a carboxyl group) or an unsubstituted or substituted aroyl or aralkanoyl group].

In the following description a steroid of the formula II above is for convenience referred to as a steroid II. Steroids II, which show remarkable solubility promoting activity on Steroid I in organic liquids and especially oils and liquids of an oil-like nature, include especially compounds of the general formula II above wherein the group R is acetyl, propionyl, iso-butyryl, hemisuccinyl or benzoyl. The 21- acetoxy compound (R = acetyl) is especially useful as a solubility promoter in accordance with this invention.

According to the present invention there is provided a composition adapted for use in medicine by injection as an anaesthetic comprising 3α-hydroxy-5α-pregnane-11,20-dione in solution in an inert organic liquid injection medium.

The term inert organic liquid injection medium as used herein means an organic liquid which is a solvent for the steroid substances used in accordance with the invention, which is suitable for parenteral injection in medicine, which is inert to the said steroid substances and which acts essentially as the liquid injection vehicle for the steroid, being the major component thereof. The organic solution according to the invention may additionally contain water, it being understood however that in said cases the organic liquid will constitute the major proportion (i.e. more than 50%) of the total injection vehicle.

As will be understood the inert organic liquid injection medium will also preferably be non-volatile and thus for practical purposes have a boiling point greater than 80°C.

The compositions of this invention fall into four categories which may be described broadly as aqueous organic solutions and non-aqueous organic solutions, together with emulsions and micro-emulsions. In the latter two cases the composition comprises the organic solution above referred to and additional water.

Aqueous-organic solutions

The steroid I may be dissolved in certain parenterally acceptable aqueous solutions of an inert organic liquid medium, for example, aqueous solutions of lower di- and polyhydric alcohols, e.g. having 2 or 3 hydroxy groups and 1–6 carbon atoms, such as propylene glycol and glycerol (which may be in the form of its formal), water soluble esters such as esters of an $\alpha$-hydroxycarboxylic acid and an alkanol having 1–6 carbon atoms such as ethyl lactate, and water-soluble amides, e.g. amides of aromatic carboxylic acids having a ring nitrogen atom or of an $\alpha$-hydroxycarboxylic acid, such as nicotinamide or N-($\beta$-hydroxyethyl) lactamide. In such solutions the additional presence of steroid II substantially increases the proportion of steroid I which may be dissolved.

The concentration of steroid I in the aqueous organic solutions preferably ranges from 0.1–4 % by weight and, when steroid II is present, from 0.5–10% by weight of steroid I, the preferred proportions by weight of steroid II to steroid I being within the range of from 1:20 to 1:1 by weight.

The aqueous-organic solutions may be prepared by dissolving the steriod(s) in an aqueous solution of the inert organic liquid medium. To achieve more rapid solution the steriod(s) may advantageously be dissolved in a volatile organic solvent, preferably having a boiling point of less than about 80°C which is miscible with water and the selected inert organic liquid medium, such as a volatile lower aliphatic ketone e.g. having 1–6 carbon atoms such as acetone or methyl ethyl ketone, or volatile halogenated hydrocarbons such as chloroform or methylene chloride. The organic medium may then be added. The volatile solvent may then be removed by evaporation, for example, by passing a stream of an inert gas through the solution, e.g. nitrogen and water thereafter added.

Solvents such as lower aliphatic ketones and volatile halogenated hydrocarbons, such as chloroform and methylene chloride are of course unsuitable for parenteral injection and are thus to be distinguished from liquids used as inert organic injection media for the purposes of the present invention.

Non-aqueous organic solutions

Inert organic liquid media which we have found particularly useful vehicles from which to form solutions of steroid I comprise lipophilic solvents such as oils (which expression is used to describe liquids having the physical characteristics of oils, irrespective of their chemical constitution), for example higher aliphatic alcohols having for example 10–15 carbon atoms and alkanoyl ($C_{1-10}$) esters thereof; esters, particularly mono-, di- and triglyceride esters and alkyl (e.g. $C_1$-$C_{14}$) esters of higher fatty acids containing for example from 12–18 carbon atoms; and hydrocarbon oils such as liquid paraffin or squalane. Particular examples of oils and oil-like liquid contemplated by this invention include especially vegetable oils, e.g. coconut oil, castor oil, corn oil, arachis oil, soyabean oil, cottonseed oil; esters such as ethyl or n-octyl oleate, isopropyl or tridecyl myristate, and isopropyl palmitate; n-dodecane, and n-hexadecane.

Solutions in oils can be prepared containing from 0.1 to 3% by weight of steroid I and when steroid II is present, from 0.3 to 25% by weight of steroid I; the preferred proportions by weight of steroid II to steroid I being for example within the range of from 1:20 to 1:1.

It should be noted that although, in accordance with this aspect of the invention, solutions can be prepared in the absence of water, aqueous emulsions and micro-emulsions can also be prepared. In such emulsions, the active steroid is however in solution in the organic phase. For the purpose of the present invention such emulsions and micro-emulsions are to be regarded as organic solutions of the steroid emulsified with water.

The oil solutions of the invention are not generally suitable for intravenous injection but may be injected intramuscularly.

The non-aqueous solutions can be prepared by dissolving the active steriod(s) in the selected inert organic liquid medium. However, to hasten solution it is preferable first to dissolve the steroid in a volatile solvent miscible with the selected medium, for example, a lower (e.g. having 1–6 carbon atoms) aliphatic ketone such as acetone or methyl ethyl ketone, or a halogenated hydrocarbon such as chloroform or methylene chloride. Acetone is preferred. The initial solution may then be admixed with the inert organic liquid medium and the volatile solvent removed, for example, by evaporation, e.g. by passing a stream of inert gas such as nitrogen through the solution.

Emulsions.

Emulsions in accordance with this invention may be prepared in generally conventional manner using a parenterally acceptable surfactant component. The surface active component must naturally be one which is physiologically compatible in the species it is intended to treat (man or animal), i.e. it should of itself give rise to no physiologically unacceptable side effects in the dosages employed.

Generally the surface active component will have an HLB value of at least 9 but preferably below 15. The surfactant component may be a mixture of two or more individual surfactants as described hereinafter. The surface active component preferably has an HLB value of not greater than 30.

Particularly useful surfactants are those carrying a polyoxyethylene grouping, for example:Polyoxyethylated derivatives of fatty (C12-C20) glyceride oils, e.g. castor oil, preferably containing at least 35 (e.g. 35 to 45 or 60 or more) oxyethylene groups, per mole of fatty oil. Polyoxyethylene ethers (containing from 10 to 30 oxyethylene groups) of long chain alcohols (containing for example from 12-18 carbon atoms).

Polyoxyethylene-polyoxypropylene ethers preferably containing from 5 to 160 (e.g. 15–50) and from 15 to 50 oxyethylene and oxypropylene groups respectively. Polyoxyethylene ethers (containing from 6 to 12 oxyethylene groups) of alkyl phenols the alkyl groups of which preferably contain 6–10 carbon atoms.

Polyoxyethylated (preferably containing from 15 to 30 oxyethylene groups) fatty acid (e.g. C12-18) esters of sugar alcohol anhydrides e.g. sorbitan or mannitan.

Polyethylene glycol esters (preferably containing from 6 to 40 ethylene oxide units) of long chain fatty acids (containing for example 12–18 C atoms) e.g. polyethylene glycol mono-oleate (preferably containing for example 8 ethylene oxide units).

Long-chain (e.g. C10–16) alkanoyl mono- and dialk-anolamides (the alkanol portions of which for example contain 1–5 C atoms) for example lauroyl mono- and di-ethanolamides are also useful.

Other useful surfactants include phospholipids such as lecithins e.g. egg or soyabean lecithins, which have proved especially suitable.

Examples of non-ionic surface active agents, of the foregoing types, preferred in accordance with the invention include:

Cremophor EL, a polyoxyethylated castor oil containing about 40 ethylene oxide units per triglyceride unit;

Tween 80, polyoxyethylene sorbitan monooleate containing about 20 ethylene oxide units;

Tween 60, polyoxyethylene sorbitan monostearate containing about 20 ethylene oxide units;

Tween 40, polyoxyethylene sorbitan monopalmitate containing about 20 ethyleneoxide units.

Pluronic F68, a block copolymer of ethylene oxide and propylene oxide containing about 150 oxy-ethylene and about 40 oxy-propylene units.

Pluronic L81, a block copolymer of ethylene oxide and propylene oxide containing about 6 oxyethylene and about 40 oxypropylene units; and Pluronic F77, a block copolymer of ethylene oxide and propylene oxide containing about 155 oxyethylene and about 35 oxypropylene units.

In addition to the emulsifying agent an emulsion stabilising agent may be present which may be for example a parenterally acceptable surface active agent of comparatively low HLB value e.g. of HLB value within the range 3–8, e.g. glyceryl monostearate, mannitan or sorbitan mono-oleate (Arlacel A and 80 respectively); or a higher (e.g. having 12–18 carbon carbon atoms) alcohol such as is conventionally used for the purpose, e.g. cetyl alcohol.

The inert organic liquid medium used to prepare the emulsions of the invention may in general be a water-immiscible member of the class type described above with reference to non-aqueous organic solutions.

Emulsions prepared from steroid I and steroid II in oil-in-water systems wherein the inert organic liquid medium is coconut oil, castor oil, corn oil, arachis oil, soyabean oil or cottonseed oil or liquids such as liquid paraffin, squalane and esters of higher (e.g. having 12–18 carbon atoms) fatty acids such as ethyl oleate and isopropyl myristate or palmitate are particularly preferred.

The emulsions may, for example, contain 5 to 50% by weight of oil, preferably 10–20%. The quantity of surface active component present may range from 0.1 to 5.0%, preferably 0.2 to 3.0% by weight.

In the emulsions according to the invention the concentration of steroid I is preferably within the range of from 0.1 – 2.5% and, where steroid II is present, steroid I is preferably within the range of 0.3–12%. The relative proportions by weight of steroid II to steroid I are preferably within the range of from 1:20 to 1:1.

The droplet size of the emulsion is preferably less than 5μm, more preferably less than 1 μm, in order to avoid embolism on intravenous injection and to ensure the physical stability of the emulsion.

The emulsions may be prepared in generally conventional manner. It is usually advantageous to form a solution of the steroid in the inert organic liquid medium by the method described above for non-aqueous organic solutions. This oily liquid can then be emulsified with the surfactant and water, for example, by homogenisation or sonication.

Micro-emulsions

The expression "micro-emulsions" is used herein to define optically clear emulsions including water together with an oil as inert organic liquid medium, the liquid being held by a surface active agent in a continuous aqueous dispersion medium, the system being virtually optically clear when viewed by transmitted light. Such micro-emulsions are distinct from emulsions or suspensions which are cloudy or opaque, unless additional components such as thickening agents are added which themselves lend opacity to the micro-emulsions.

Optically clear micro-emulsions of the kind utilised in the present invention include all colloidal solutions wherein the particles or droplets of the disperse phase are of a diameter below about 800°A and thus no longer cause appreciable opacity to visible light. The size range of the particles will generally be between approximately 50°–800°A. This is in contradistinction to normal or macro-emulsions wherein the average droplet size is seldom less than 5,000 A. The conditions required for formation of microemulsions are such that the resulting system is thermodynamically stable, in contrast to macroemulsions which are necessarily thermodynamically unstable, even though the equilibrium conditions of phase separation may be greatly delayed (L. I. Osipow, J. Soc. Cosmetic Chem. 1963, 14, 277–288; L. M. Prince, J. Colloid and Interface Science, 1967, 23, 165–173).

The micro-emulsions, being in general optically clear solutions, are not only more elegant in appearance than emulsions or suspensions but have manufacturing advantages. They are far easier to sterilise and the preparations are, in general, more stable to transport vibration and temperature fluctuation on storage. They may be readily produced by simply mixing the components without energetic homogenisation.

Surprisingly, considerable quantities, for example of the order of 12% w/v or more, of steroid I, particularly when steroid II is present, may be incorporated in the micro-emulsions according to this invention.

Where steroid I is used without steroid II, it is difficult to incorporate more than 0.1 to 0.6% by weight of steroid but where a steroid II is incorporated the proportion of steroid I can be substantially increased e.g. in the range 0.3–12%. Preferably the proportion of steroid II to steroid I is within the range of 1:20 – 1:1.

The amount of steroid that can be incorporated in the micro-emulsion according to this invention will depend in each case on the components that are present, especially the surface active components.

As will be well recognised by those skilled in the art it is necessary that the vehicle should contain, in view of the very small radius of curvature of the droplets, a surface disordering agent. Such surface disordering agents will usually be amphiphilic substances of shorter chain length than the principal surfactant and may be thought of as exerting a "lubricating" effect by becoming interposed between the longer amphiphilic molecules of the principal surfactant.

It should be noted that many non-ionic surfactants which are commercially available contain relatively short chain components such as alcohols which are capable of acting as surface disordering agents without addition of further material having this action.

Such amphiphilic surface disordering agents include physiologically acceptable long chain alcohols preferably having at least 12 (e.g. 12–18) carbon atoms and polyethylene glycols having a molecular weight in excess of 4000.

The weight ratio fo added surface disordering agent to total principal surface active agent advantageously employed to obtain transparent stable solutions is strongly dependent on the temperature range over which clarity is required. The amount is also dependent on the nature of the inert organic liquid medium and other surface active agents employed. In our preferred mixtures we have found the percentage by weight of the total surface active agent for clarity at body temperature advantageously to be 5–60%, preferably from 10–15%. It may be noted that the minimum quantity of the principal surface active agent required to produce a clear solution may often be lower when a surface disordering agent is present.

The inert organic liquid medium used in the micro emulsions of the invention may in general be a water-immiscible member of the class described above with reference to non-aqueous organic solutions.

The inert organic liquid medium may, for example, be an oil which is liquid at body temperature. In general, however, the liquid component is preferably liquid at 35°C, more preferably at room temperature and below, to facilitate handling of injectable preparations.

The liquid medium may thus be a lipophilic material such as an aliphatic hydrocarbon, including branched chain and cycloaliphatic hydrocarbons or mixtures thereof, for example n-dodecane or n-hexadecane. Purified paraffin oil and squalane are particularly useful examples of this class. Other lipophilic materials include natural or synthetic long chain esters or mixtures thereof such as isopropyl myristate, tridecyl myristate, n-octyl oleate or vegetable oils such as coconut oil, castor oil, arachis oil, soyabean oil, or cotton seed oil.

The surface active agents used in preparing the micro-emulsions may in general be the same as those described above for use in preparing the emulsions of the invention.

When the lipophilic material is an ester or a straight or branched chain aliphatic hydrocarbon, such as paraffin oil or squalane, the surface active component preferably possesses an HLB (hydrophile-lipophile balance) value in of at least 9 but preferably less than 15, advantageously between 9 and 11. It will again be noted that where a mixture of surface active agents is used, it is the resultant HLB value of the mixture (i.e. the "surfactant components") which should fall within the above range.

The preferred surface active agents fall in the following five classes:

1. Fatty acid (e.g. C12–18) esters of sugar alcohol anhydrides, for example of sorbitan or mannitan. Fatty acid moieties in such substances include oleate, stearate, laurate residues etc. Sorbitan mono-oleate and mannitan mono-oleate are especially useful and mannitan mono-oleate is obtainable in a "specially purified" grade widely used in injectable preparations. Commercial products of this class include Arlacel A (mannitan mono-oleate), Arlacel 80 (sorbitan monooleate) and Arlacel 20 (sorbitan mono-laurate).

2. Ethylene oxide condensates of the products of class (1) (containing for example 15–30 oxyethylene groups). Polyoxyethylene sorbitan mono-oleate and mono-laurate are particularly useful. Commercial products of this class include Tween 80 (polyoxyethylene (20) sorbitan mono-oleate), Tween 20 (polyoxyethylene (20) sorbitan mono-laurate), Tween 81 (polyoxyethylene (5) sorbitan mono-oleate) and Tween 85 (polyoxyethylene (20) sorbitan trioleate), The numerical values given in parenthesis in the nomenclature for the above products refer to the approximate number of oxyethylene units. The products are, in fact, always mixtures and this figure merely represents the average chain length.

3. Polyoxyethylene derivatives of alkyl phenols. The alkyl portions of such phenols preferably contain 6 to 10 carbon atoms e.g. as in octyl or nonyl groups. Products of this type having polyoxyethylene chains of varying lengths (e.g. 6–12 oxyethylene groups) are commercially available.

4. Polyoxyethylene derivatives (e.g. containing 10–30 oxyethylene groups) of fatty (e.g. C12–18) alcohols e.g. lauryl, stearyl alcohol etc. Again, materials of varying chain lengths are obtainable.

5. Ethylene oxide condensates of glyceride oils, e.g. of castor oil such as Cremophor EL, a polyoxyethylated castor oil containing about 40 oxyethylene units per triglyceride unit. The glyceride oil may for example have 12–20 carbon atoms and the condensate contain at least 35 oxyethylene groups per mole of fatty oil. This last class is particularly preferred.

The micro-emulsions can readily be prepared by dissolving the steroid in the inert organic liquid medium for example by the method described above for non-aqueous organic solutions, dissolving a suitable surfactant in the medium and mixing with injectable water. Due to the thermodynamic stability of the micro-emulsions, very little energy is required for dispersion.

In general, the ratio of surfactant to inert organic liquid medium in the micro-emulsion will preferably be at least 2:1, the concentration of organic liquid medium being preferably at least 5 and preferably not more than 30% by weight.

As indicated in the aforesaid application Ser. No. 47,163 of Davis et al, and as is usual in the case of anaesthetics, the quantity of steroid I used to induce anaesthesia depends on the weight of the individual to be anaesthetised.

For intravenous administration in the average man a dose of from 0.45 to 3.5 mg/Kg will in general be found to be satisfactory to induce anaesthesia, the preferred dose being within the range of from 0.7 to 2.5 mg/Kg. Generally a dose of about 1.35 mg/Kg is very satisfactory. The dose will naturally vary to some extent dependent upon the physical condition of the patient, and the degree and period of anaesthesia required, all as is well known in the art. It is thus possible by adjustment of the dose to achieve durations of anaesthesia varying from about 10 minutes to up to an hour or more. If it is desired to maintain prolonged anaesthesia, repeated doses of the compositions of this invention may be used, such repeated doses being generally either of the same order or lower than the original dose. Alternatively continuous administration may be undertaken at for example a rate of 0.09–1.8 mg/Kg/Min.

Where the anaesthetic compositions of this invention are administered intramuscularly, naturally higher doses are generally necessary as will be apparent to those skilled in the art.

The various forms of compositions according to the invention are preferably presented in dosage unit form, i.e. in containers, for example ampoules or vials, each such container containing from 10 mg to 300 mg of the aforesaid steroid I. While, as stated above, the dose to be given to any particular patient will depend on his weight and physical condition and the degree and period of anaesthesia required, dosage units having a content of active ingredient within the range just mentioned will be found to provide the anaesthetist with a convenient quantity of anaesthetic in a single unit from which the particular dose required for a given patient may readily be taken.

The composition of this invention may further include one or more parenterally acceptable, water-soluble substances serving to render the compositions approximately isotonic with blood suitable substances for this purpose being dextrose, glycerol and sodium chloride.

In order that the invention may be well understood the following Examples are given by way of illustration only. Percentages are by weight.

EXAMPLE 1

A mixture containing 0.45 g of 3α-hydroxy-5α-pregnane-11,20-dione and 0.15 g of 21-acetoxy-3α-hydroxy-5α-pregnane-11,20-dione was dissolved in 3 ml of acetone. To this was added 5 ml of coconut oil. The acetone was removed by purging with nitrogen gas. The clear solution of steroids in oil was added to 45 ml of a 1% Tween 80 solution while agitating vigorously with a turbine mixer. After 5 minutes agitation, the particle size of the emulsion was further reduced by repeatedly passing through a laboratory homogenizer. The emulsion contained no particles greater than 5 μm and the majority were less than 1 μm in diameter. The resulting emulsion contained 1.2% total steroids and 10% of coconut oil.

EXAMPLE 2

Example 1 was repeated except that arachis oil (20%) was used instead of coconut oil and the emulsifier was Cremophor EL (1%) instead of Tween 80.

EXAMPLE 3

Example 1 was repeated except that castor oil (10%) was used in place of coconut oil and the emulsifier was a mixture of soya lecithin (1%) and Pluronic F68 (2%) in place of Tween 80.

EXAMPLE 4

Example 1 was repeated except that castor oil (5%) and cetyl alcohol (1%) were used to dissolve the steroids, and the emulsifier was Cremophor EL (1%) instead of Tween 80.

EXAMPLE 5

Example 1 was repeated except that isopropyl myristate (10%) was used instead of coconut oil and Cremophor EL (1%) was used as emulsifier instead of Tween 80.

EXAMPLE 6

A mixture containing 0.9 g of 3α-hydroxy-5α-pregnane-11,20-dione and 0.3 g of 21-acetoxy-3α-hydroxy-5α-pregnane-11,20-dione was dissolved in 5 ml of acetone. To this was added 50 ml of propylene glycol. The acetone was removed by heating in a stream of nitrogen. The solution of steroids in propylene glycol was diluted to 100 ml with sterile distilled water.

EXAMPLE 7

Example 6 was repeated except that the propylene glycol was replaced by 50 ml of glycerol formal.

EXAMPLE 8

0.9 g of 3α-hydroxy-5α-pregnane-11,20-dione and 0.3 g of 21-acetoxy-3α-hydroxy-5α-pregnane-11,20-dione were dissolved in 5 ml of acetone at 20°C. The resulting solution was added to a mixture of 5 g of coconut oil and 10 g of Cremophor EL. The acetone was removed at 50°C by a stream of nitrogen. The solution was heated at 70°C for 15 minutes in a stream of nitrogen and subsequently diluted with sterile distilled water containing 0.25 g of sodium chloride to a final volume of 100 ml. The solution was gently stirred or shaken until homogeneous.

EXAMPLE 9

0.45 of 3α-hydroxy-5α-pregnane-11,20-dione and 0.15 g of 21-acetoxy-3α-hydroxy-5α-pregnane-11,20-dione were dissolved in a mixture of 2.5 g of coconut oil and 5 g of Cremophor EL, by heating at 70°C in a stream of nitrogen for 30 minutes. While stirring gently, the hot solution was diluted to a final volume of 50 ml with sterile distilled water containing 0.125 g of sodium chloride.

EXAMPLE 10

Example 8 was repeated except that a mixture of 5 g of coconut oil and 15 g of Tween 80 was used.

EXAMPLE 11

A mixture containing 0.9 g of 3α-hydroxy-5α-pregnane-11,20-dione and 0.3 g of 21-acetoxy-3α-hydroxy-5α-pregnane-11,20-dione was dissolved in 5 ml of acetone. To this was added 20 ml of soyabean oil containing 1 g of Arlacel A and 0.5 g of Pluronic L81. After removing the acetone by a stream of nitrogen, the resulting clear solution was added to 80 ml of an aqueous solution containing 1 g of Pluronic F68 and 2.5 g of glycerol and the mixture emulsified in a hand-homogeniser.

EXAMPLE 12

A mixture containing 9 g of 3α-hydroxy-5α-pregnane-11,20-dione and 3 g of 21-acetoxy-3α-hydroxy-5α-pregnane-11,20-dione was dissolved in 40 ml of acetone. To this was added 200 ml of coconut oil containing 2 g of cetyl alcohol. The acetone was removed and the solution mixed with 800 ml of water containing 3 g of Pluronic F68, 12 g of soya lecithin and 25 g of glycerol. The mixture was subsequently emulsified in a high-pressure homogeniser for 30 minutes at 4,000 lb/sq. in.

EXAMPLE 13

0.9 g of 3α-hydroxy-5α-pregnane-11,20-dione and 0.3 g of 21-acetoxy-3α-hydroxy-5α-pregnane-11,20-dione were dissolved in 5 ml of acetone and the solution mixed with 20 g of coconut oil containing 0.1 g of cetyl alcohol. The acetone was removed and the solution mixed with 80 ml of distilled water containing 2.5 g of glycerol, 1.2 g of soya lecithin, 0.3 g of Pluronic F68 and 0.2 g of Pluronic F77. The mixture was emulsified in a hand-homogenieser and subsequently sterilised by autoclaving at 15 lb/sq. in. for 20 minutes.

We claim:

1. A composition adapted for use in medicine by intravenous injection as an anaesthetic comprising 3α-hydroxy-5α-pregnane-11,20-dione in solution in an inert liquid injection medium consisting essentially of a solution of water in an organic liquid selected from the group consisting of a polyhydric alcohol having 2 or 3 hydroxy groups and 1–6 carbon atoms and a water soluble ester of an α-hydroxy carboxylic acid and an alkanol having 1–6 carbon atoms in which the organic liquid constitutes more than 50% of the total injection medium, said composition being in unit dosage form, each dosage containing 10 to 300 mg of the 3α-hydroxy-5α-pregnane-11,20-dione.

2. A composition as claimed in claim 1 wherein the liquid injection medium comprises propylene glycol, glycerol or glycerol formal.

3. A composition as claimed in claim 1 wherein 3α-hydroxy-5α-pregnane-11,20-dione is present in an amount of 0.1–4% by weight.

4. A method of inducing anaesthesia which method comprises intravenously administering to a subject a composition as claimed in claim 1.

* * * * *